UNITED STATES PATENT OFFICE.

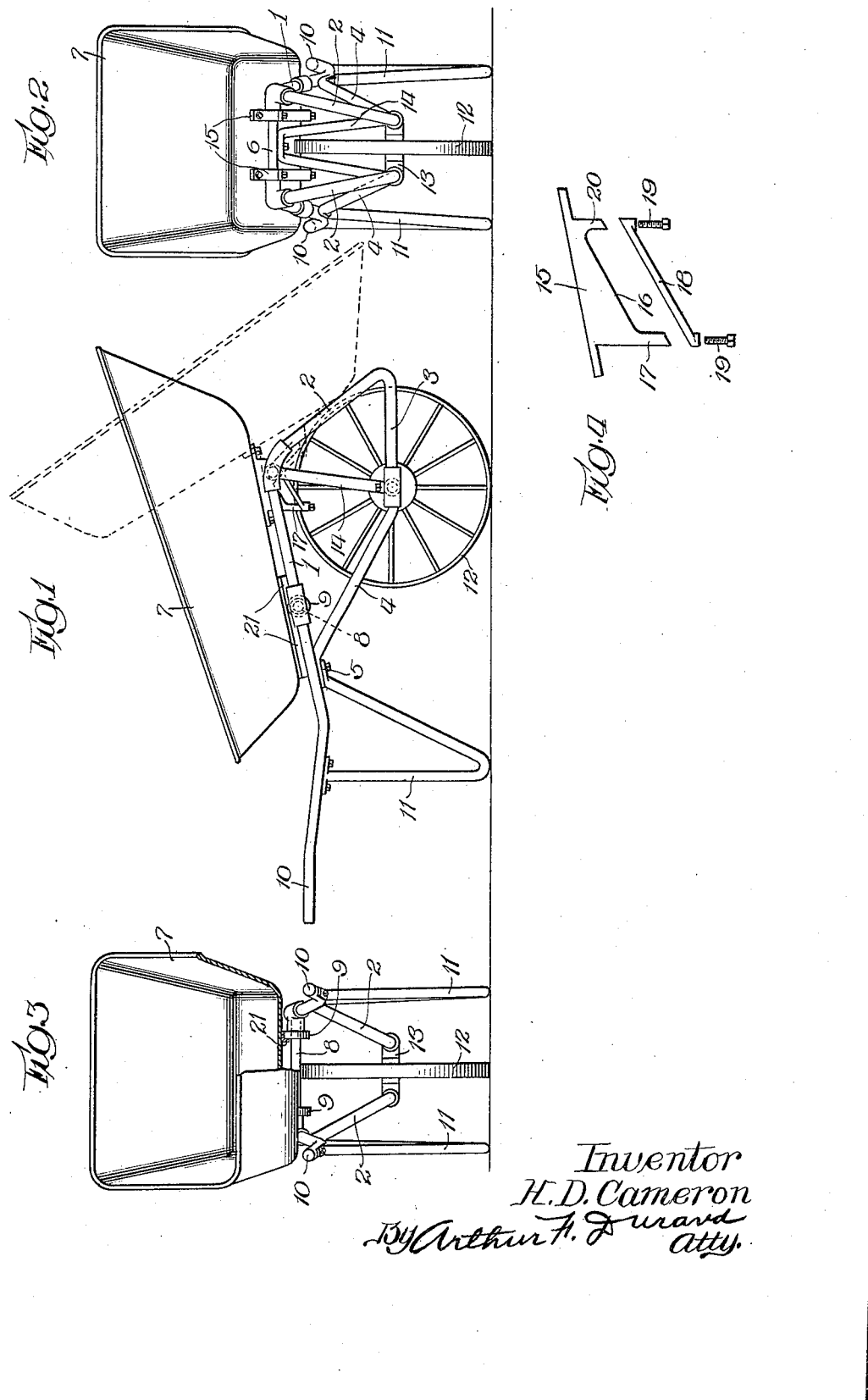

HARVEY D. CAMERON, OF CHICAGO, ILLINOIS.

WHEELBARROW OR OTHER DUMPING VEHICLE.

1,402,050.   Specification of Letters Patent.   Patented Jan. 3, 1922.

Application filed November 26, 1920. Serial No. 426,392.

*To all whom it may concern:*

Be it known that I, HARVEY D. CAMERON, of Chicago, Cook County, Illinois, have invented a certain new and useful Improvement in Wheelbarrows or other Dumping Vehicles, of which the following is a specification.

This invention relates to dumping vehicles in general, and more particularly to wheelbarrows having a tilting receptacle or load carrier.

Generally stated, the object of the invention is to provide an improved construction and arrangement, whereby in a wheelbarrow or other dumping vehicle, the receptacle or load carrier is free to slide or shift forward a distance, relatively to the transverse axis about which it thereafter tilts to dump the load, so that the load will be safely carried without danger of dumping while the vehicle is traveling along, and whereby the tilting action will be facilitated when the time comes to dump the load, the shifting of the load carrier bodily from a position on said axis in which it tends to tilt backward, to a position in which it tends to tilt forward, serving to facilitate the dumping of the load and to reduce the labor and effort necessary for this purpose.

It is also an object to provide certain details and features of construction and combinations tending to increase the general efficiency and the desirability of a dumping vehicle of this particular character.

To the foregoing and other useful ends the invention consists in matters hereinafter set forth and claimed, and shown in the accompanying drawings in which:

Figure 1 is a side elevation of a dumping wheelbarrow embodying the principles of the invention, showing the receptacle or load carrier in carrying position in full lines, and in dumping position in dotted lines, Figure 2 is a front elevation of said wheelbarrow, Figure 3 is a rear elevation of said wheelbarrow, showing a portion of the pan or receptacle or load carrier broken away for convenience of illustration, Figure 4 is an enlarged side elevation of one of the guides forming the sliding connection between the load carrier and the transverse axis on the body frame.

As thus illustrated, the invention comprises a frame including side members 1, downwardly extending or inclined front members 2, lower parallel side members 3, connecting the lower ends of the members 2 with the front ends of the braces 4, the latter being secured to the side members 1 at 5 in any suitable or desired manner. The side members 1 are connected by a transverse member 6 which forms the transverse axis of the tilting pan or receptacle or load carrier 7, and said members 1 are also connected by a rigid transverse member 8 provided with supports 9 for the bottom of said receptacle. The side members 1 extend rearwardly and are provided with handles 10 for the wheelbarrow, and legs 11 are secured to the members 1 and the rear extensions thereof, to support the wheelbarrow on the ground in the usual and well-known manner. The single front wheel 12 is disposed between the members 3 and 4, being provided with suitable bearings 13, and vertically disposed braces 14 connect the under side of the transverse axis member 6 with said bearings, so that a very strong and rigid frame is provided. If desired, the different portions of the frame can be made of tubing, and the different sections of tubing can be connected by pipe couplings of any suitable character, so that the frame will be inexpensive as well as strong and rigid and at the same time not too heavy.

The receptacle or load carrier 7 not only tilts about the transverse axis member 6, in order to discharge the load on the ground in front of the wheel 12, but also has a forward sliding or shifting movement on the body frame. As shown in Figure 1, the said receptacle or load carrier is in its carrying position, so that the center of gravity is in rear of the transverse axis member 6, so that the wheel barrow may be trundled along in the ordinary manner. Guides 15 are secured to the under side of the receptacle or load carrier, each guide having an inclined edge 16 to slide back and forth on the member 6, whereby forward movement of the receptacle or load carrier tends to raise the load from the frame, as it must in one sense slide up-hill. Obviously, therefore, while the wheelbarrow is in ordinary position on the ground, or is being trundled along in the usual manner, the receptacle or load carrier 7 will not slide forward, as this is prevented by the inclined edges 16 of the guides. However, as soon as the handles 10 are raised sufficiently to tilt the wheelbarrow forward beyond a certain angle, so that the edges 16 are substantially horizontal, the receptacle or load carrier 7 will then slide forward until the axis member 6 bears against the lug 17 at the rear end of each guide. This transverse axis about which the receptacle or load carrier tilts is fixed relatively to the body of the wheel barrow, of course, but with this sliding connection said axis and load carrier have relative movement, so that when the load carrier slides forward the axis is brought nearer the rear end of the load carrier. Before the load carrier slides forward, the center of gravity is in rear of the transverse axis formed by the member 6, but after the wheelbarrow is tilted upward a distance, and after the load carrier slides forward, the center of gravity is then in front of said transverse axis, so that the load carrier will then gravitate of its own accord and tilt about said axis to dumping position. Guards 18 are secured by screws 19 to the lower ends of the lugs 17 and 20 of each guide, these guards extending under the axis member 6, whereby the receptacle or load carrier cannot be displaced or disconnected from the body frame but will be retained thereon in any position thereof. When the wheelbarrow is then again lowered to the ground, and the receptacle or load carrier 7 is pulled down, the receptacle will then slide backward into carrying position, so that it will be ready to receive the next load. While the wheelbarrow is being moved or trundled along in the usual manner, the bulk of the load is carried well back on the body frame, behind the wheel, but when the handles 10 are raised the receptacle or load carrier soon reaches an angle which enables it to slide bodily forward. As soon as it reaches the limit of its forward shifting movement, the receptacle then tilts of its own accord into an inclined position to discharge the load from the front end thereof on to the ground in front of the wheel.

The receptacle or load carrier can be of any suitable, known or approved character or shape. Preferably, however, the front end of the receptacle is so shaped or formed that the load will readily slide out when the load carrier is tilted into dumping position.

The supports 9, it will be seen, are preferably rollers on the cross member 8, adapted to engage the bottom of the receptacle or load carrier. Also, as shown, the receptacle is preferably provided with guides or tracks 21, consisting of angle iron sections, to slide on said rollers, thereby to reduce friction when the receptacle slides forward in discharging the load, as well as backward when restored to normal position.

While the invention is shown in connection with a wheel barrow, it is obvious that the vehicle may be of any suitable or desired character and that the tilting frame upon which the load carrier slides forward by gravity, so that it moves downward of its own accord before tilting, may be supported in any suitable or desired manner, and that the means for tilting said frame about a transverse axis, preferably at the forward end of the frame, may be of any suitable character, the essential requirement being the tilting of the frame until the load carrier slides forward and downward by gravitational motion thereof, whereby the load carrier moves of its own accord into a forward position in which it is then free to tilt by gravity into dumping position.

What I claim as my invention is:

1. In a dumping vehicle, the combination of a tilting frame, a tilting load carrier mounted for gravitational movement to both slide and tilt on said frame, means on the frame to support the load carrier for tilting motion about a fixed axis on said frame, having provisions whereby said load carrier is movable bodily a distance on said frame before tilting, means for tilting said frame and thereby causing the gravitational motion of the load carrier into position to then gravitate about said axis into the dumping position thereof, and means to support said frame for the tilting motion thereof.

2. A structure as specified in claim 1, said provisions comprising a guide which is movable on said axis at an angle tending to raise the load carrier from the frame.

3. A structure as specified in claim 1, said frame having inclined portions forming a stop to limit the tilting motion of the load carrier.

4. A structure as specified in claim 1, said frame having a single wheel in front, and said means for tilting the frame and causing the load carrier to move bodily comprising a pair of handles for tilting said frame on said wheel to shift the load carrier forward by gravity.

5. A structure as specified in claim 1, said vehicle being a wheelbarrow in general form, and said provisions being inoperative to permit shifting of the load carrier until after the entire wheelbarrow is tilted forward beyond a certain angle.

6. A structure as specified in claim 1, said vehicle being a wheelbarrow over the wheel of which said load carrier slides forward into position to gravitate about said axis to dump the load in front of the wheel.

7. A structure as specified in claim 1, said load carries being slidable from its carrying position in which the center of gravity of the load is in rear of said axis to a forward position in which the center of gravity is in front of said axis.

8. A wheelbarrow having a receptacle which is slidable forward and backward thereon by raising and lowering the handles of the wheelbarrow in the ordinary manner, and adapted in its forward position to tilt relatively to said handles about a transverse axis to dump the load, and having means whereby the forward motion is downward, so that the receptacle gravitates into position for said tilting thereof, and means to limit the gravitational sliding movement of the receptacle.

9. A wheelbarrow having a receptacle which tilts forward thereon about a transverse axis to dump the load, and means whereby the receptacle must shift forward bodily a distance by gravity before tilting, and whereby such movement is produced by raising the handles of the wheelbarrow, having provisions to limit the gravitational forward movement of the receptacle.

10. A wheelbarrow having a sliding and tilting receptacle which, when the handles of the wheelbarrow are raised, is then slidable forward bodily of its own accord by gravity and which then tilts forward relatively to said handles to facilitate the dumping of the load.

11. A wheelbarrow having a body frame and a front wheel and a tilting receptacle which is free to shift bodily by gravity and which first slides a distance by gravity and then tilts forward by gravity against the front end of the frame when the handles of the wheelbarrow are raised to discharge the load on the ground in front of said wheel.

12. A structure as specified in claim 1, said provisions comprising rollers on the body frame, and means on the bottom of the load carrier to engage said rollers.

13. A structure as specified in claim1, said provisions comprising guides having means whereby the load carrier is removable from the body frame.

HARVEY D. CAMERON.